United States Patent
Foffano et al.

[11] Patent Number: 5,955,017
[45] Date of Patent: Sep. 21, 1999

[54] METHOD FOR PRODUCING SHOE SOLES BY INJECTION-MOLDING

[75] Inventors: Massimo Foffano, Treviso; Riccardo Perotto, Volpago del Montello, both of Italy

[73] Assignee: Nordica S.p.A., Trevignano, Italy

[21] Appl. No.: 08/792,680

[22] Filed: Jan. 29, 1997

[30] Foreign Application Priority Data

Feb. 2, 1996 [IT] Italy .................................. TV96A0012

[51] Int. Cl.⁶ .................................................. B29C 45/14
[52] U.S. Cl. .......................... 264/161; 264/138; 264/244; 264/250; 264/261; 264/275; 425/119; 425/129.2; 12/146 BP
[58] Field of Search ..................... 264/161, 244, 264/250, 261, 275, 138; 425/119, 129.2; 12/142 RS, 146 B, 146 BP, 146 BR

[56] References Cited

U.S. PATENT DOCUMENTS 2,178,086  10/1939  Szerenyi ....................................... 18/59
3,949,040  4/1976  Drab ........................................ 264/161
4,090,831  5/1978  Hujik ....................................... 425/119
4,562,606  1/1986  Folschweiler ....................... 12/142 RS

FOREIGN PATENT DOCUMENTS

A-1180521  1/1885  Canada .
C-3730858  12/1988  Germany .
A-4143329  11/1992  Germany .
A-9010528  9/1990  WIPO .

*Primary Examiner*—Jan H. Silbaugh
*Assistant Examiner*—Edmund H. Lee
*Attorney, Agent, or Firm*—Guido Modiano; Albert Josif

[57] ABSTRACT

Method for producing soles for shoes, which initially includes the production, by molding, of a sole that has a perimetric ridge that protrudes downwards. The sole is then placed on a plunger of a mold that has a head which is shaped complementarily with respect to the lower surface of the sole and with respect to the ridge and in which there is a recess for containing the ridge and a gap for the intended flow of a second material to be injected. The last step consists in trimming the flash, which has an intended consistency.

12 Claims, 3 Drawing Sheets

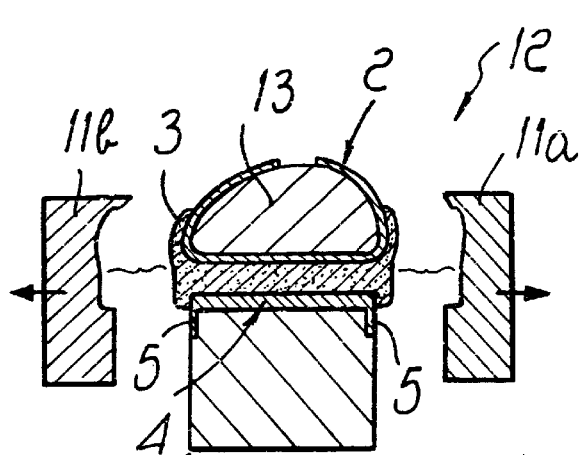
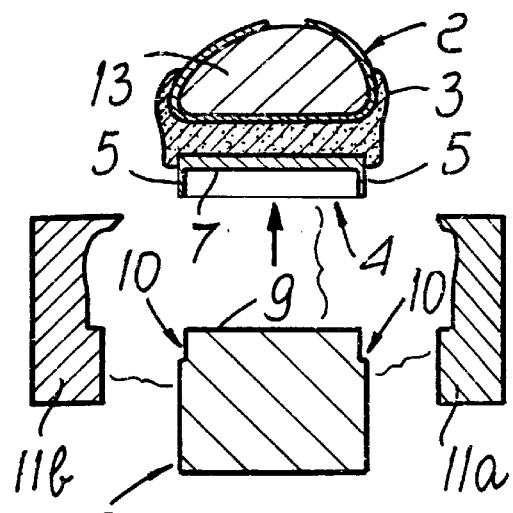
Fig. 7
Fig. 8
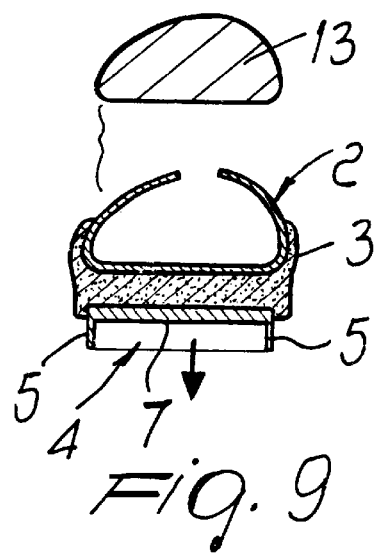
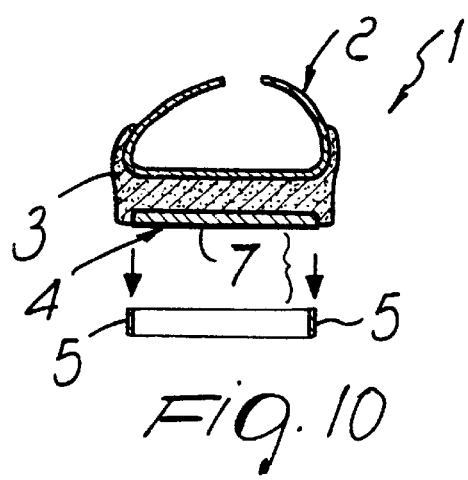
Fig. 9
Fig. 10
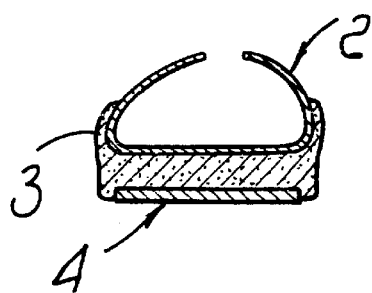
Fig. 12

METHOD FOR PRODUCING SHOE SOLES BY INJECTION-MOLDING

BACKGROUND OF THE INVENTION

The present invention relates to a method for producing shoe soles by injection-molding. It is known to produce, by virtue of appropriate molds, the sole of a shoe by placing a tread in a mold. The tread is made of an adapted material, such as for example rubber, adapted to provide greater grip on the ground.

The tread has a perimetric ridge that protrudes at an angle of approximately 90° with respect to the lateral surface of the sole and constitutes a confinement barrier for the subsequent injection-molding of thermoplastic materials.

A second material, such as for example polyurethane, is then injection-molded to obtain a collar that constitutes the shell for anchoring the upper to the tread.

In these conventional molds, closure occurs on a horizontal plane, so that the injection of polyurethane forms, along the ridge of the tread, flash of considerable thickness and possibly discontinuous, which protrudes laterally to the upper end of the sole that does not interact with the ground.

The presence of the flash constitutes a considerable drawback as regards the overall time and cost for producing the finished sole.

The lateral flash must in fact be removed and this requires trimming it in an optimum manner, since in order to allow the subsequent anchoring, for example of the polyurethane, the sole must then be treated by washing, chlorination, and gluing.

Difficulties have in fact been found, in the prior art, specifically as regards controlling the chlorination of the sole, especially at its lateral edge from which the flash protruded.

It has in fact been observed that perimetric separation, for example of the polyurethane injection-molded over the tread, can occur; this entails either the rejection of the product during quality control or, as an even worse drawback, perimetric separation on the first time the product is used, i.e. when the first stress is applied to the sole.

Another drawback that has been observed in the prior art consists of the fact that molding in place, for example of the polyurethane, on the rubber tread is not always easy, because the tread can shift inside the mold as there are no locator points for its position.

SUMMARY OF THE INVENTION

The aim of the present invention is to solve the described technical problems, eliminating the drawbacks of the cited prior art by providing a method that allows to produce soles for shoes by injection-molding and allows high production with low costs.

Within the scope of this aim, an important object is to provide a method that allows to considerably reduce the number of rejects, eliminating the possibility of mutual separation of the two components that are injection-molded to form the sole.

An important object is to provide a method that allows to obtain a product whose processing and finishing is simple and quick and can also be performed with adapted machines.

Another important object is to provide a method that can be repeated without changes over time, in that it is possible to optimally injection-mold in place a second material on a previously formed sole, keeping constant over time technical characteristics such as thicknesses and/or distances between the two materials.

Another object is to provide a method that allows to facilitate and easily control steps such as the chlorination of the sole, so as to further contain production costs.

This aim, these objects, and others which will become apparent hereinafter are achieved by a method for producing soles for shoes by injection-molding, characterized in that it comprises the following steps:

a) molding said sole with a perimetric ridge that protrudes below the resting surface at least along a portion of the perimeter of said sole;

b) placing said sole on a plunger with a complementarily-shaped head that has a recess for containing said ridge and a gap that allows the controlled flow of material injected subsequently so as to form a collar and/or a shell for connection to an upper;

c) cutting said ridge and said flowed material.

BRIEF DESCRIPTION OF THE DRAWINGS

Further characteristics and advantages of the invention will become apparent from the detailed description of a particular but not exclusive embodiment, illustrated only by way of non-limitative example in the accompanying drawings, wherein:

FIG. 7 is a view, similar to FIG. 6, of the opening of the shells of the mold;

FIG. 8 is a view, similar to FIG. 7, of the extraction of the last from the mold;

FIG. 9 is a view, similar to FIG. 8, of the extraction of the last from the shoe;

FIG. 10 is a transverse sectional view of the shoe after the flash and the material flowed thereon have been cut;

FIG. 12 is a view, similar to FIG. 10, of the finished shoe;

DESCRIPTION OF THE PREFERRED EMBODIMENTS

Figure 1:
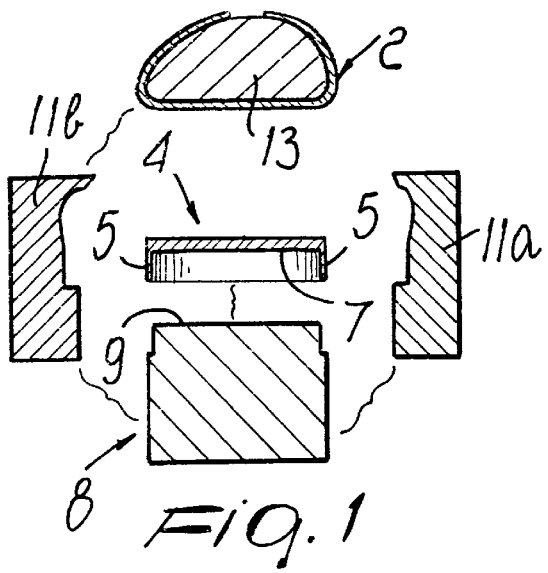
FIG. 1 is a schematic view of the mold, of the sole, and of an upper with a last.
Figure 2:
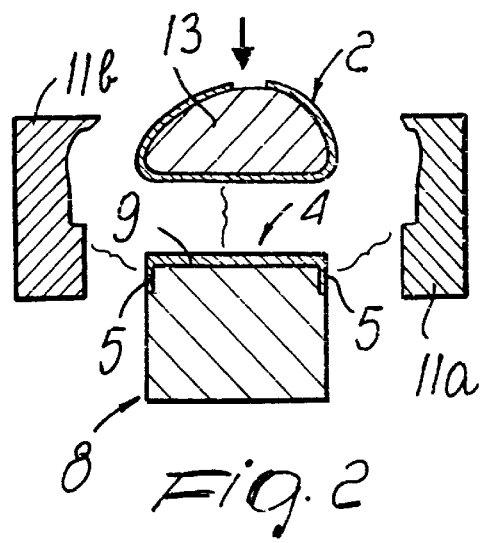
FIG. 2 is a view, similar to FIG. 1, of the sole arranged on the plunger.
Figure 3:
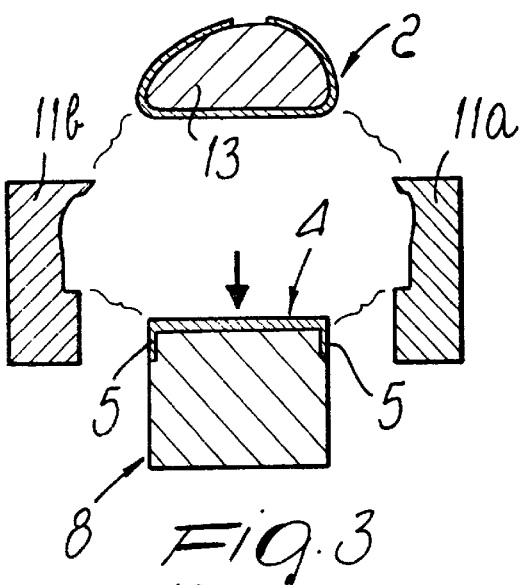
FIG. 3 is a view, similar to FIG. 2, of the lowering of the last.
Figure 4:
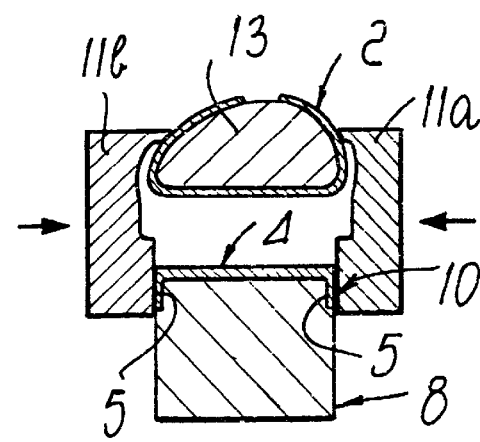
FIG. 4 is a view, similar to FIG. 3, of the movement of the shells toward the last.
Figure 5:
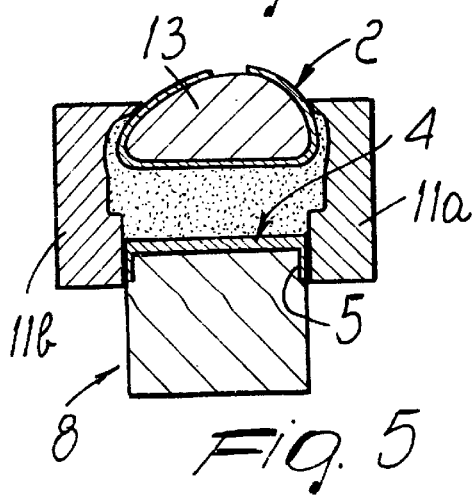
FIG. 5 is a view, similar to FIG. 4, of the injection of the material that constitutes the collar.

With reference to the above figures, the reference numeral 1 designates a shoe constituted by an upper 2, which is associated at an adapted collar 3 that is rigidly coupled to a sole 4.

The method for producing the sole and the collar of the shoe initially comprises molding the sole 4 in an adapted mold, for example by vulcanizing rubber, so as to form, during this molding, a ridge 5 which protrudes perimetrically and downwards with respect to the ground resting plane (i.e. lower surface) of the sole.

This perimetric ridge is obtained so that it forms an angle β, with respect to the plane of arrangement of the lower surface 7 of the sole 4, of 90° to 180°.

The production of this ridge, with this specific location and angle, allows on one hand to quickly and simply perform its chlorination for the subsequent injection-molding in place of material and on the other hand constitutes a precise locator element for the mold used for this subsequent step.

The method in fact entails placing the sole 4 thus obtained at an adapted plunger 8, which has a head 9 that is shaped complementarily to the lower surface 7 of the sole 4 and to the ridge 5, so as to allow a correct and stable placement of said sole, which during the subsequent injection step does not move despite the internal pressures generated by the expansion of the material.

The head 9 of the plunger 8 also has another feature, i.e., it has a gap 10 between said head 9 and the ridge 5 and the facing surface of the rings 11a and 11b of the mold 12, between which the upper 2 is also closed with an adapted last 13 preinserted therein.

The rings 11a and 11b of course have surfaces that allow the injection of a second material, such as for example polyurethane, to produce the collar 3.

Indeed, as shown in FIGS. 2 to 5, once the rings have been closed around the upper and the plunger, the material that subsequently constitutes the collar 3 is injected; by means of the gap 10, said material affects, with intended thicknesses, the lateral surface of the ridge 5; a controlled flow is thus achieved, for example of polyurethane, at the ridge 5.

Figure 6:
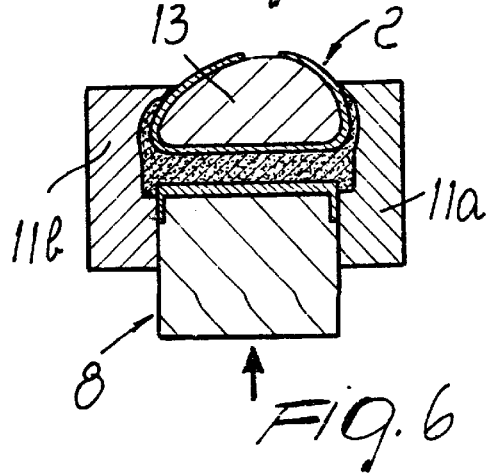
FIG. 6 is a view, similar to FIG. 5, of the rise of the plunger.

Said flow is facilitated, during injection, by the rise of the plunger 8, as shown in FIG. 6.

Figure 11:
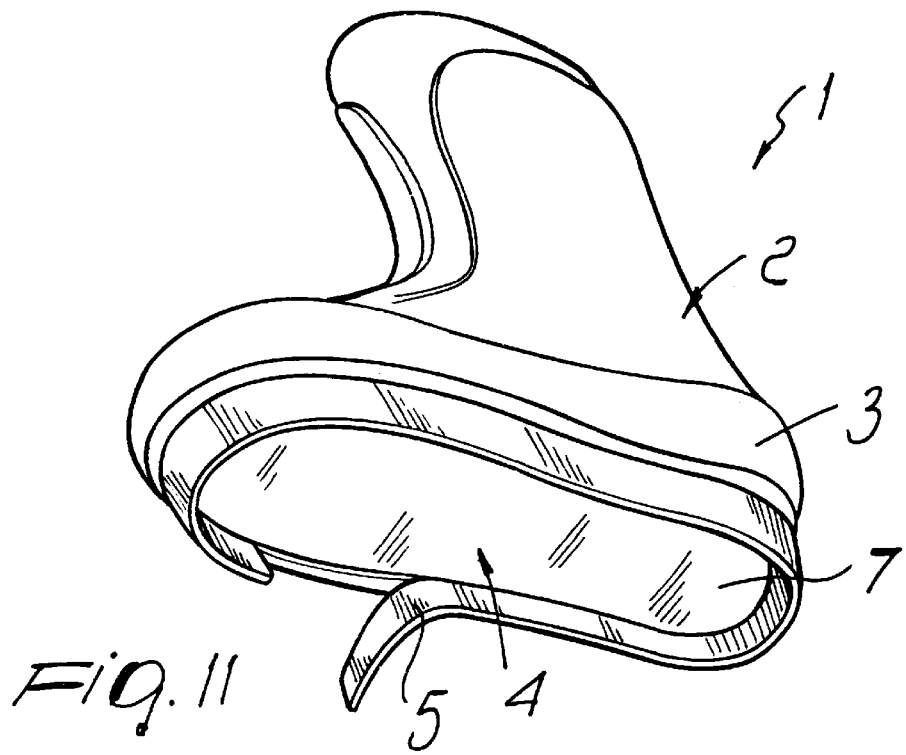
FIG. 11 is a perspective view, taken from below, of the shoe in the step shown in FIG. 9.
Figure 13:
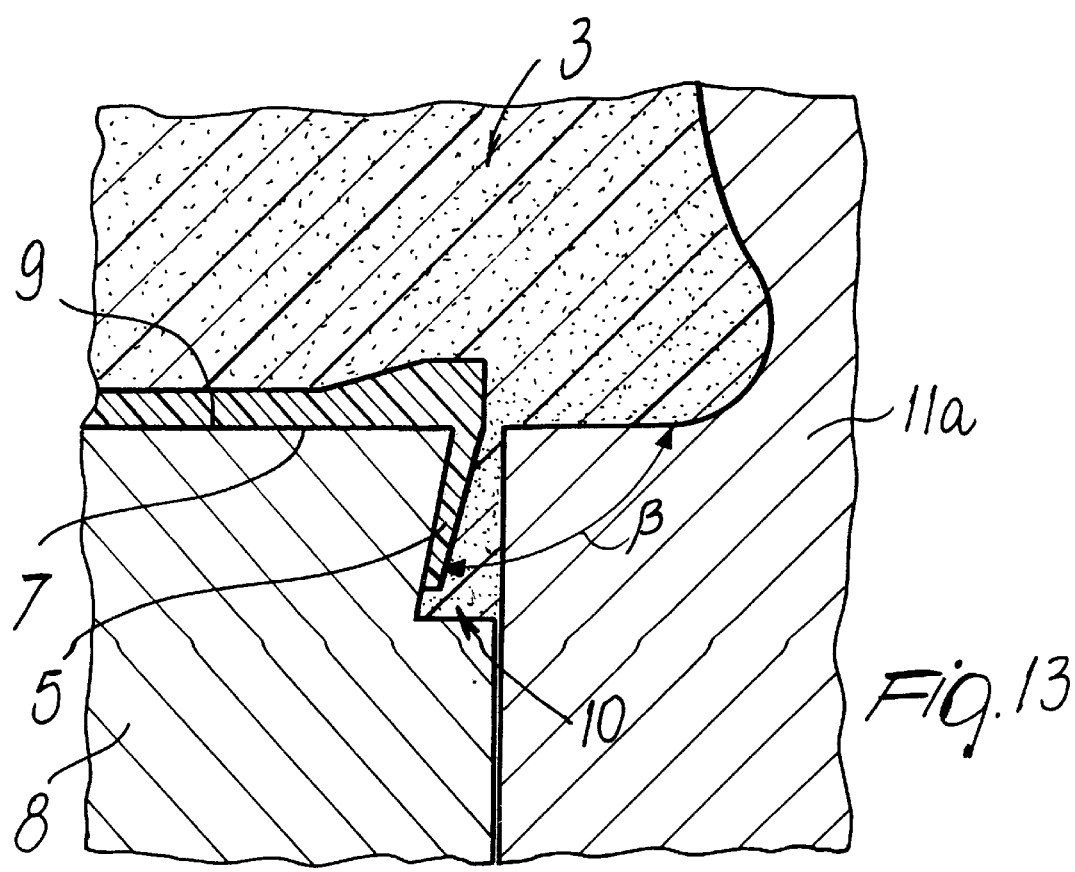
FIG. 13 is a detail view of the configuration of the head of the plunger, illustrating the recess for containing the ridge and the gap for the controlled flow of the material that constitutes the collar.

Once the materials have been cooled, the shells have been opened, the shoe has been extracted and the last has been extracted from the upper, the shoe of FIG. 11 is obtained. In the shoe, the ridge 5 protrudes below the sole but the material injected in place has an intended consistency besides having an optimum mutual coupling of the materials.

Finally, the method comprises cutting the ridge and the material that has flowed thereon. This cutting can also be performed automatically with adapted machines, in view of the desired consistency that can be given to the ridge and of the ease of the cutting operation, which does not occur laterally to the sole but below it.

It has thus been observed that the invention has achieved the intended aim and objects, a method having been provided which allows to achieve an optimum coupling between the two materials constituted by the sole and by the collar, in practice eliminating production rejects and thus considerably increasing production.

The production costs are also reduced by the simplicity of the intermediate operations, such as for example cleaning and chlorination, at the same time increasing the quality of the product, since the sole, during the injection-molding in place of the material that constitutes the collar, is fixed in position and is not subject to movement caused by the expansion of the product.

The resulting product is also aesthetically pleasant, since the coupling of the two products is visible only below the sole and therefore in a region that is not visible during use.

The method according to the invention is susceptible of numerous modifications and variations, all of which are within the scope of the appended claims.

Likewise, the materials may also be the most pertinent according to the specific requirements.

What is claimed is:

1. Method for producing a sole and at least one of a collar and a shell for connection to an upper of a shoe by injection-molding, comprising the following succesive steps:

molding said sole with a perimeter so as to form a resting surface of said sole and a perimetric ridge of said sole that protrudes below the resting surface at least along a portion of the perimeter of said sole;

placing said sole on a complementarily-shaped head of a plunger;

inserting a configuration of said sole placed on said complementarily-shaped head of said plunger inside a mold so as to form a gap externally to said ridge between said ridge and an inner surface of said mold;

injecting a controlled flow of heated fluid material into said mold so that said fluid material flows in said gap and so as to form said at least one of said collar and said shell for connection to said upper; and cutting said ridge from said resting surface of said sole.

2. Method according to claim 1, comprising molding said sole such that said perimetric ridge extends to form an angle with respect to a plane of arrangement of said resting surface comprised between 90° and 180°.

3. Method according to claim 2, comprising molding said sole such that said ridge extends inwardly of said sole with respect to said perimeter.

4. Method according to claim 1, comprising injecting said fluid material such that said material is arranged at a lateral surface of said ridge in correspondence with said gap.

5. Method according to claim 4, further comprising a step of arranging an upper in said mold together with said configuration of said sole placed on said complementarily-shaped head of said plunger such that during said injecting step the fluid material flows in contact with said upper for connecting said sole with said upper.

6. Method according to claim 5, comprising arranging said upper in said mold together with the configuration of said sole placed on said complementary-shaped head of said plunger so that a space is formed between said upper and said sole and further comprising infecting said material into said space, and wherein during the step of injection said plunger is raised for moving said sole towards said upper.

7. Method according to claim 6, further comprising cooling said material such that a portion of said material is attached to said ridge, and cutting said ridge and said portion of said material.

8. Method for producing a sole and at least one of a collar 2nd a shell for a shoe, comprising the following steps:

molding said sole in a mold so as to form a ground resting surface of said sole and a ridge of said sole that protrudes perimetrically and downwards with respect to the ground resting surface of said sole;

placing said sole on a complementarily-shaped head of a plunger;

inserting a configuration of said sole placed on said complementarily-shaped head of said plunger inside a mold so as to form a gap between said ridge and an inner surface of said mold; and injecting heated fluid material into said mold so that said fluid material flows in said gap and so as to form at least one of said collar and said shell.

9. Method according to claim 8, comprising injecting said fluid material such that said material is arranged at a lateral surface of said ridge in correspondence with said gap.

10. Method according to claim 9, further comprising a step of arranging an upper in said mold together with said configuration of said sole placed on said complementarily-shaped head of said plunger such that during said injecting step the fluid material flows in contact with said upper for connecting said sole with said upper.

11. Method according to claim 10, comprising arranging said upper in said mold together with the configuration of said sole placed on said complementary-shaped head of said plunger so that a space is formed between said upper and said sole and further comprising injecting said material into said space, and wherein during the step of injection said plunger is raised for moving said sole towards said upper.

12. Method according to claim 11, further comprising cooling said material such that a portion of said material is attached to said ridge, and cutting said ridge and said portion of said material.

* * * * *